US011993073B2

(12) United States Patent
Suzuki et al.

(10) Patent No.: US 11,993,073 B2
(45) Date of Patent: May 28, 2024

(54) PRINTING APPARATUS AND PRINTING METHOD

(71) Applicant: CANON KABUSHIKI KAISHA, Tokyo (JP)

(72) Inventors: Yoshiaki Suzuki, Chiba (JP); Hiromasa Yoneyama, Kanagawa (JP); Ryohei Maruyama, Kanagawa (JP); Itaru Wada, Kanagawa (JP); Tomohito Abe, Kanagawa (JP); Tsutomu Obata, Tokyo (JP); Noriyuki Aoki, Tokyo (JP); Yasuyuki Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/104,004

(22) Filed: Jan. 31, 2023

(65) Prior Publication Data

US 2023/0241905 A1 Aug. 3, 2023

Related U.S. Application Data

(63) Continuation of application No. 17/124,109, filed on Dec. 16, 2020, now Pat. No. 11,590,777.

(30) Foreign Application Priority Data

Dec. 27, 2019 (JP) ................................ 2019-239283

(51) Int. Cl.
*B41J 11/00* (2006.01)
*B41J 11/66* (2006.01)
(Continued)

(52) U.S. Cl.
CPC .......... *B41J 11/006* (2013.01); *B41J 11/0095* (2013.01); *B41J 11/663* (2013.01);
(Continued)

(58) Field of Classification Search
CPC ..... B41J 11/006; B41J 11/0095; B41J 11/663; B41J 11/706; B41J 3/46; B41J 11/42;
(Continued)

(56) References Cited

U.S. PATENT DOCUMENTS 6,763,763 B2 7/2004 Honeck et al.
8,783,859 B2 7/2014 Tokisawa et al.
(Continued)

FOREIGN PATENT DOCUMENTS

EP 2 727 737 A1 5/2014
JP H10291306 A * 11/1998 ................ B41J 2/01
(Continued)

OTHER PUBLICATIONS

Extended European Search Report dated Jun. 7, 2021, in European Patent Application No. 20213146.2.
(Continued)

*Primary Examiner* — Yaovi M Ameh
(74) *Attorney, Agent, or Firm* — Venable LLP

(57) ABSTRACT

A printing apparatus that includes a holding unit configured to hold a roll sheet performs supplying the sheet by rotating the roll sheet held by the holding unit; nipping and conveying the supplied sheet; performing printing on the conveyed sheet; detecting occurrence of a print medium jam of the sheet; and, if the printing apparatus has detected a print medium jam of the sheet, performing a control process of supplying the sheet in a state in which the conveying is stopped.

20 Claims, 5 Drawing Sheets

(51) Int. Cl.

| | |
|---|---|
| ***B41J 11/70*** | (2006.01) |
| ***B65H 7/06*** | (2006.01) |
| ***B65H 26/02*** | (2006.01) |
| *B41J 3/46* | (2006.01) |
| *B41J 11/42* | (2006.01) |
| *B41J 15/08* | (2006.01) |

(52) U.S. Cl.
CPC .............. *B41J 11/706* (2013.01); *B65H 7/06* (2013.01); *B65H 26/02* (2013.01); *B41J 3/46* (2013.01); *B41J 11/42* (2013.01); *B41J 15/08* (2013.01); *B65H 2511/528* (2013.01)

(58) Field of Classification Search
CPC . B41J 15/08; B65H 7/06; B65H 26/02; B65H 2511/528
See application file for complete search history.

(56) References Cited

U.S. PATENT DOCUMENTS

| | | | | | |
|---|---|---|---|---|---|
| 9,230,199 | B2 | 1/2016 | Matsuzawa | | |
| 9,405,259 | B2 | 8/2016 | Kitamoto | | |
| 9,586,417 | B2 | 3/2017 | Chida | | |
| 11,541,674 | B2 | 1/2023 | Wada et al. | | |
| 2011/0194861 | A1 | 8/2011 | Shiraishi | | |
| 2012/0200885 | A1 | 8/2012 | Matsuzawa | | |
| 2012/0263514 | A1* | 10/2012 | Tanami | .................... | B41J 15/04 400/613 |
| 2014/0036017 | A1 | 2/2014 | Naruse | | |
| 2016/0136981 | A1 | 5/2016 | Suzuki et al. | | |
| 2019/0354056 | A1 | 11/2019 | Homma et al. | | |

FOREIGN PATENT DOCUMENTS

| | | | | | |
|---|---|---|---|---|---|
| JP | 2003-050490 | A | 2/2003 | | |
| JP | 2012-161935 | A | 8/2012 | | |
| JP | 2013-103413 | A | 5/2013 | | |
| JP | 2014-202927 | A | 10/2014 | | |
| JP | 2015-091641 | A | 5/2015 | | |
| JP | 2017-149509 | A | 8/2017 | | |
| JP | 2017149509 | A * | 8/2017 | ............... | B65H 7/06 |
| JP | 2019-199350 | A | 11/2019 | | |
| WO | WO-2016114759 | A1 * | 7/2016 | .............. | B41J 19/00 |

OTHER PUBLICATIONS

Office Action dated Jan. 5, 2024, in Japanese Patent Application No. 2019-239283.
Office Action dated Jul. 18, 2023, in Japanese Patent Application No. 2019-239283.

* cited by examiner

PRINTING APPARATUS AND PRINTING METHOD

BACKGROUND OF THE INVENTION

Field of the Invention

The present invention relates to mainly a printing apparatus and a printing method.

Description of the Related Art

So far, there has been proposed a printing apparatus that processes a print medium jam when the jam has occurred between a printhead that performs printing on a roll print medium such as roll paper and a cutter thereafter. Japanese Patent Laid-Open No. 2003-50490 proposes a printing apparatus that performs, when occurrence of a print medium jam is detected, in accordance with the position of the leading end (paper edge) of the roll paper, either one of a jam process operation to operate the cutter to cut the roll paper and a jam process operation to rewind the roll paper without operating the cutter.

However, if both of operating the cutter and rewinding the roll paper are difficult due to the print medium jam that has occurred, it is preferable that the user performs the jam process. In such a case, the user may cut the roll paper near the printhead to remove the print medium jam. In this case, there is a risk of unintentionally touching the print head, or a risk of moving the cutter and damaging the sheet or the inside of the printing apparatus. Therefore, poor convenience of a jam process performed by a user has been a problem.

SUMMARY OF THE INVENTION

Therefore, the present invention has as its object to provide a printing apparatus that improves convenience upon performing a jam process by a user.

One aspect of the present invention provides a printing apparatus comprising: a holding unit configured to hold a roll sheet; a supply unit configured to supply the sheet by rotating the roll sheet held by the holding unit; a conveying unit configured to nip and convey the sheet supplied from the supply unit; a printing unit configured to perform printing on the sheet conveyed from the conveying unit; a detecting unit configured to detect occurrence of a print medium jam of the sheet; and a control unit configured to, if the detecting unit has detected a print medium jam of the sheet, perform a control process of supplying the sheet by the supply unit in a state in which the conveying unit is stopped.

Further features of the present invention will become apparent from the following description of exemplary embodiments (with reference to the attached drawings).

DESCRIPTION OF THE EMBODIMENTS

Figure 1:
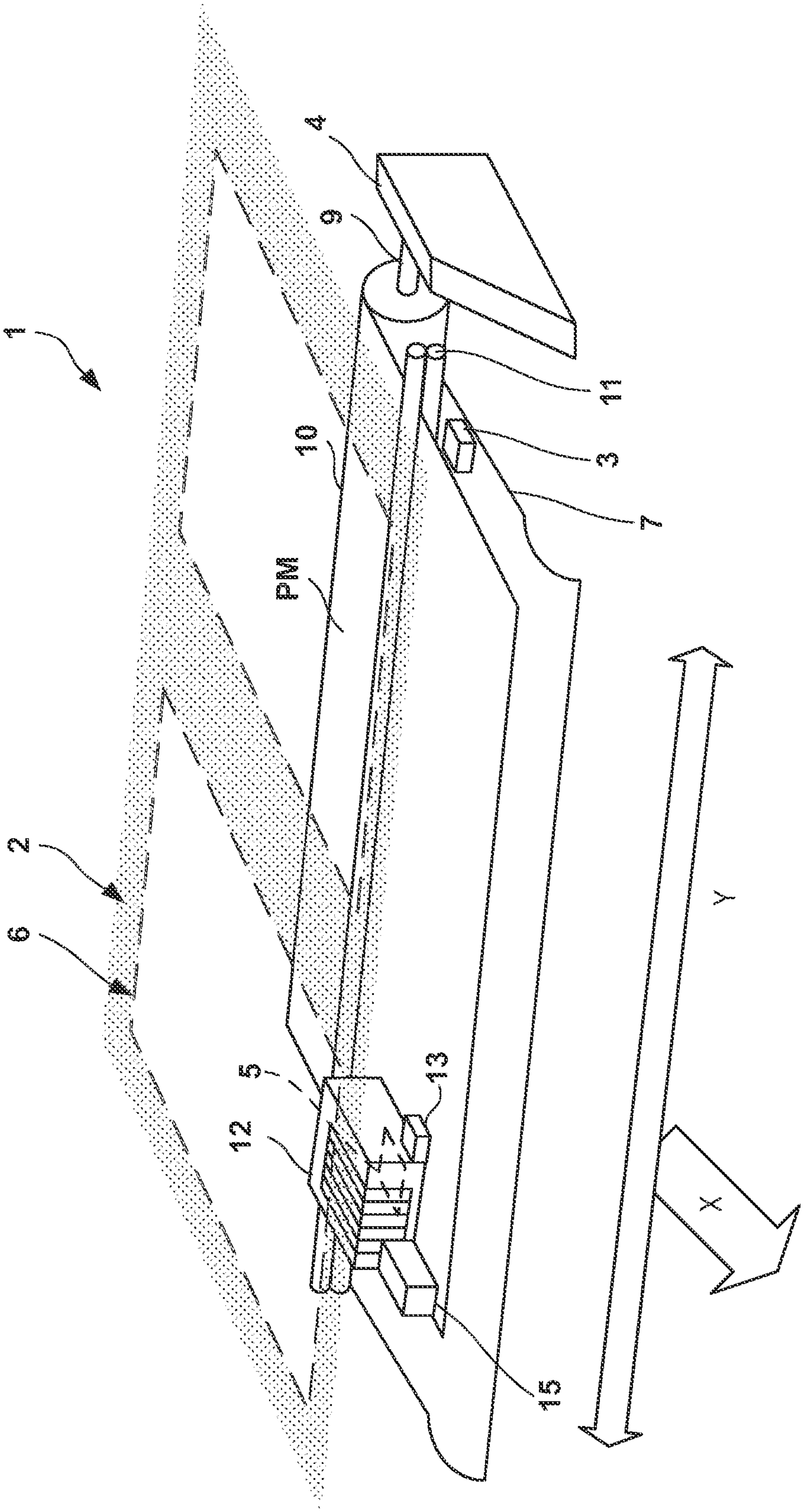
FIG. 1 is a schematic view of a printing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic view of a printing apparatus 1 according to this embodiment. This embodiment will exemplify a case in which the present invention is applied to a serial type inkjet printing apparatus. However, the present invention can be applied to other types of printing apparatuses.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium", cloth, plastic film, and the like may be used as print media. Further, in this embodiment, a roll print medium obtained by winding the sheet-like paper is assumed, but an unwound print medium may be used as the print medium.

<Arrangement of Apparatus>

The printing apparatus 1 is an apparatus which includes a conveying unit 11, a conveyance sensor 3, a supply unit 4, a printing unit 5, a detecting unit 13, and a cutter unit 15, and prints an image on a print medium PM. In this embodiment, the print medium PM is a roll sheet 10 wound in a roll form. However, the print medium PM may be a cut sheet cut in a standard size in advance. The conveying unit 11 draws the print medium PM from the roll sheet 10 by the length required to print an image. Note that the roll sheet 10 may be provided with a driving mechanism which rotates the roll sheet to assist drawing and taking up the print medium PM. The printing apparatus 1 according to this embodiment further includes a frame 2 including openings 6, and the frame 2 at least partially covers the printing unit 5 and the cutter unit 15.

The supply unit 4 includes a holding unit that holds a roll sheet obtained by winding a continuous sheet into a roll form, and a driving unit that rotationally drives the sheet held by the holding unit. The supply unit 4 rotates the roll sheet 10 held by the holding unit to supply the roll sheet in the paper feed direction (the direction indicated by an arrow X) of the roll sheet 10 and the rewinding direction (−X direction) of the roll sheet 10. A spool member 9 is inserted into the paper tube of the roll sheet 10 and is pivotally supported by the holding unit of the supply unit 4. The supply unit 4 rotates the roll sheet 10 by rotating the spool member 9 using a motor.

The conveying unit 11 is a conveyance roller for conveying the print medium PM. In this embodiment, the conveying unit 11 includes a pair of a driving roller and a driven roller. The conveying unit 11 includes a driving mechanism (not shown), and rotationally drives the driving roller. The driven roller is pressed against the driving roller and rotationally driven. Therefore, the print medium PM is nipped between the driving roller and the driven roller, and conveyed on a platen 7. As the driving mechanism for the conveying unit 11, for example, a gear mechanism having a motor as a drive source can be used. A sensor (for example, an encoder) (not shown) detects the rotation amount of the conveying unit 11 to control the conveyance amount of the print medium PM.

In the following description, the terms "upstream side" and "downstream side" are used with reference to the conveying direction of the print medium PM by the conveying unit 11. The conveying direction of the print medium PM is indicated by the arrow X in FIG. 1 and sometimes called a sub-scanning direction. An arrow Y indicates a direction perpendicular to the conveying direction of the print medium PM. This direction is sometimes called the main scanning direction or a paper widthwise direction. The roll sheet 10 and the conveying unit 11 are arranged such that their axial directions are parallel to the main scanning direction Y.

The conveyance sensor 3 is a sensor such as an optical sensor arranged on the downstream side of the conveying unit 11 in the conveying direction, and used to determine whether the roll sheet is appropriately conveyed by the conveying unit 11.

The printing unit 5 is arranged on the downstream side of the conveying unit 11, and capable of printing an image on the print medium PM conveyed by the conveying unit 11. In this embodiment, the printing unit 5 forms a printhead including a plurality of nozzles that discharge ink.

The printing unit 5 is mounted on a carriage 12. A tank which supplies ink to the printing unit 5 is mounted in the carriage 12. A driving mechanism (not shown) can reciprocally move the carriage 12 in the Y direction. As a driving mechanism for the carriage 12, for example, a belt transmission mechanism having a motor as a drive source can be used. The detecting unit 13 or a sensor (for example, an encoder) (not shown) detects the position of the carriage 12 to control the movement of the carriage 12.

The detecting unit 13 can detect the image printed on the print medium PM, an edge of the print medium PM, the thickness of the print medium PM, or the like. The detecting unit 13 is mounted on the carriage 12 and moves in the Y direction, together with the carriage 12. The detection result obtained by the detecting unit 13 can be associated with a position on the print medium PM by using the detection result of the position of the carriage 12 and the conveyance amount of the print medium PM by the conveying unit 11. In one example, the detecting unit 13 detects the position of the carriage 12.

The detecting unit 13 includes, for example, an optical sensor including a light-emitting element and a light-receiving element. The light-emitting element irradiates the platen 7 with light. The light-receiving element receives the reflected light. When detecting the leading end position of the print medium PM by using the detecting unit 13, for example, the print medium PM is conveyed to temporarily pass through the detecting unit 13, and then conveyed backward to the upstream side. When the leading end of the print medium PM passes through the detecting unit 13, the value of light received by the light-receiving element varies due to the difference in reflectance between the platen 7 and the print medium PM. It is possible to detect the position of the leading end of the print medium PM from the detection result of the rotation amount of the conveying unit 11. Likewise, it is also possible to detect the position of the image printed on the print medium PM from the detection result of the rotation amount of the conveying unit 11 at a change point of the light-reception result obtained by the light-receiving element and the detection result of the position of the carriage 12.

The cutter unit 15 cuts the print medium PM in the Y direction. The cutter unit 15 has an engaging structure with the carriage 12, and when engaged with the carriage 12, it can reciprocally move in the Y direction while being pulled by the carriage 12. The cutter unit 15 includes a cutter. In one example, the cutter unit 15 may include a pressure sensor that detects the pressure applied on the cutter.

If the print medium PM is not cut, the carriage 12 pulls the cutter unit 15 to a region where the roll sheet does not pass in the Y direction and disengages the engaging structure to arrange the cutter unit 15 in the region where the roll sheet does not pass. On the other hand, if the print medium PM is to be cut, the carriage 12 is connected to the cutter unit 15 and locks the engaging structure, thereby pulling the cutter unit 15 to cut the print medium PM.

Figure 5:
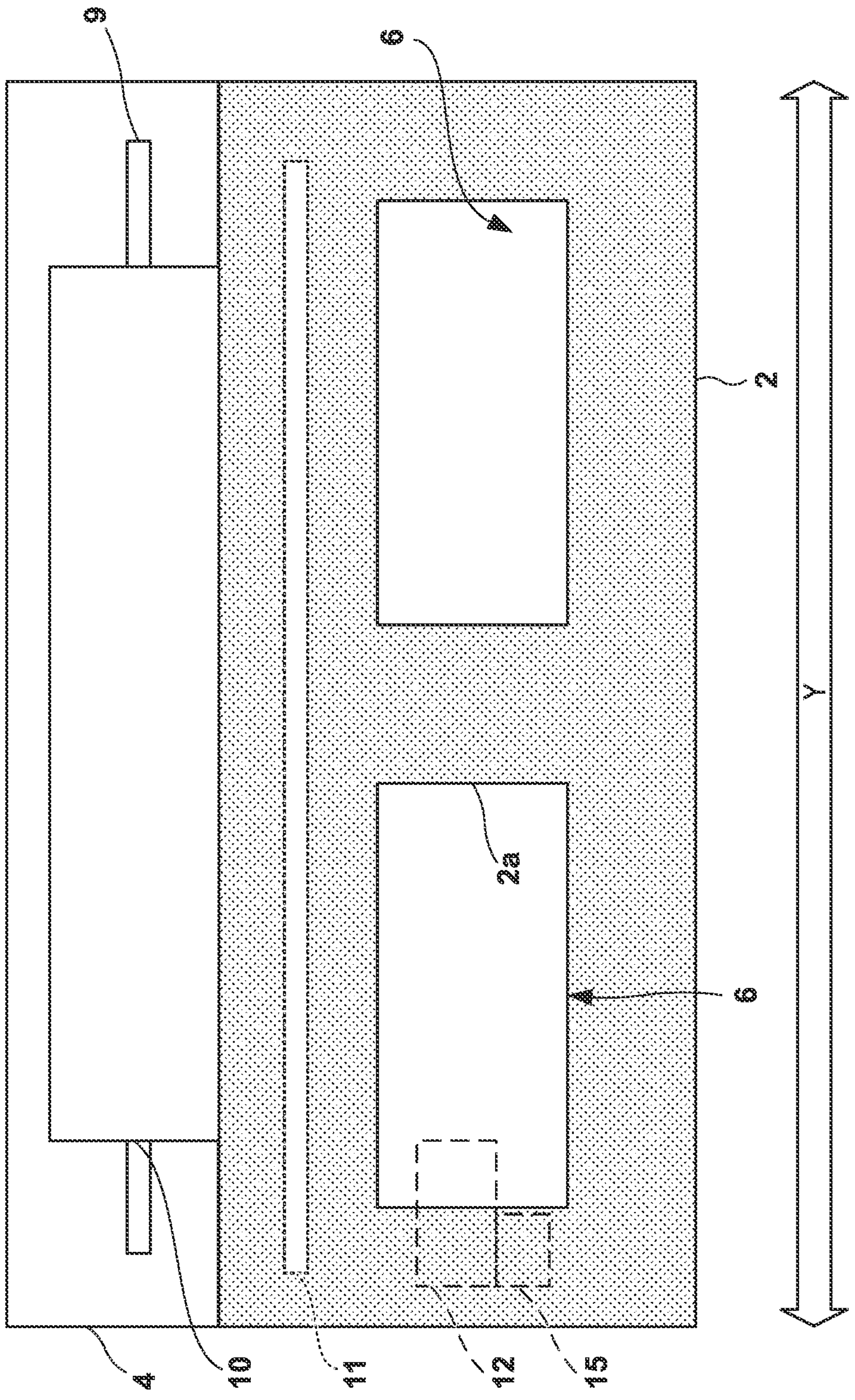
FIG. 5 is a top view of the printing apparatus according to the embodiment.

FIG. 5 shows a top view of the printing apparatus according to this embodiment. The supply unit 4 holds the spool 9 that supports the shaft of the roll sheet 10. The frame 2 at least partially covers the region where the carriage 12 and the cutter unit 15 move. On the other hand, the opening 6 is arranged to enable replacement of the cartridge set in the carriage 12. In one example, the frame 2 includes a beam-shaped structure **2*a*** to increase the rigidity of the entire frame.

<Control Unit>

Figure 2:
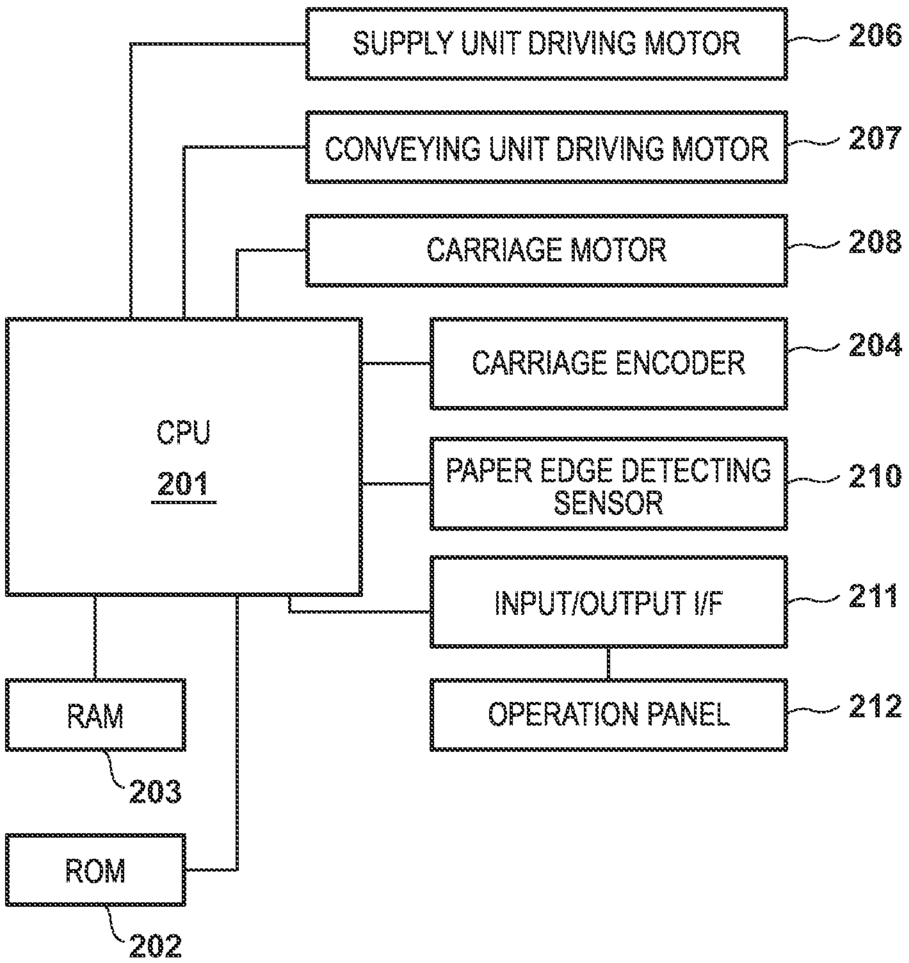
FIG. 2 is a block diagram showing the arrangement of the control unit of the printing apparatus according to the embodiment.

The arrangement of the control unit of the printing apparatus 1 will be described with reference to FIG. 2. A CPU 201 is a processor, a programmable logic circuit, or a microprocessor that controls the entire printing apparatus 1. In addition, the CPU 201 performs various processes such as a print process and a cutting process by reading out control programs stored in a ROM 202 and cooperating with a RAM 203 and the like. The ROM 202 is a storage area for the control programs, for example, a flexible disk, a magnetic disk, an optical disk, a magnetooptical disk, a CD-ROM, a CD-R, a DVD-ROM, a magnetic tape, a non-volatile memory card, an EEPROM, a silicon disk, or the like. The RAM 203 is a volatile memory used as a work area and the like for executing various programs by the CPU 201.

When the CPU 201 performs the print process, a carriage encoder 204 determines the movement amount of the carriage 12 based on data to be printed, and generates a control signal for a carriage motor 208. In one example, the carriage encoder 204 also generates a control signal for performing print control of the printing unit 5. A supply unit driving motor 206 is a driving motor included in the supply unit 4. A conveying unit driving motor 207 is a driving motor for driving the conveying unit 11. The carriage motor 208 is a motor for reciprocally moving the carriage 12 in the paper widthwise direction.

A paper edge detecting sensor 210 determines, based on the detection result of at least one of the conveyance sensor 3 and the detecting unit 13, the range where the leading end of the roll sheet is located. In one example, the paper edge detecting sensor 210 performs a paper edge determination process of determining whether the paper edge is located at a position where the cutter unit 15 can cut the paper.

At least an operation panel 212 is connected to an input/output interface (I/F) 211, and a notification can be given to a user. Further, the input/output I/F 211 is an acceptance unit to which an input device including buttons, keys, or the like is connected and capable of accepting a user input.

<Example of Print Process>

Figure 3:
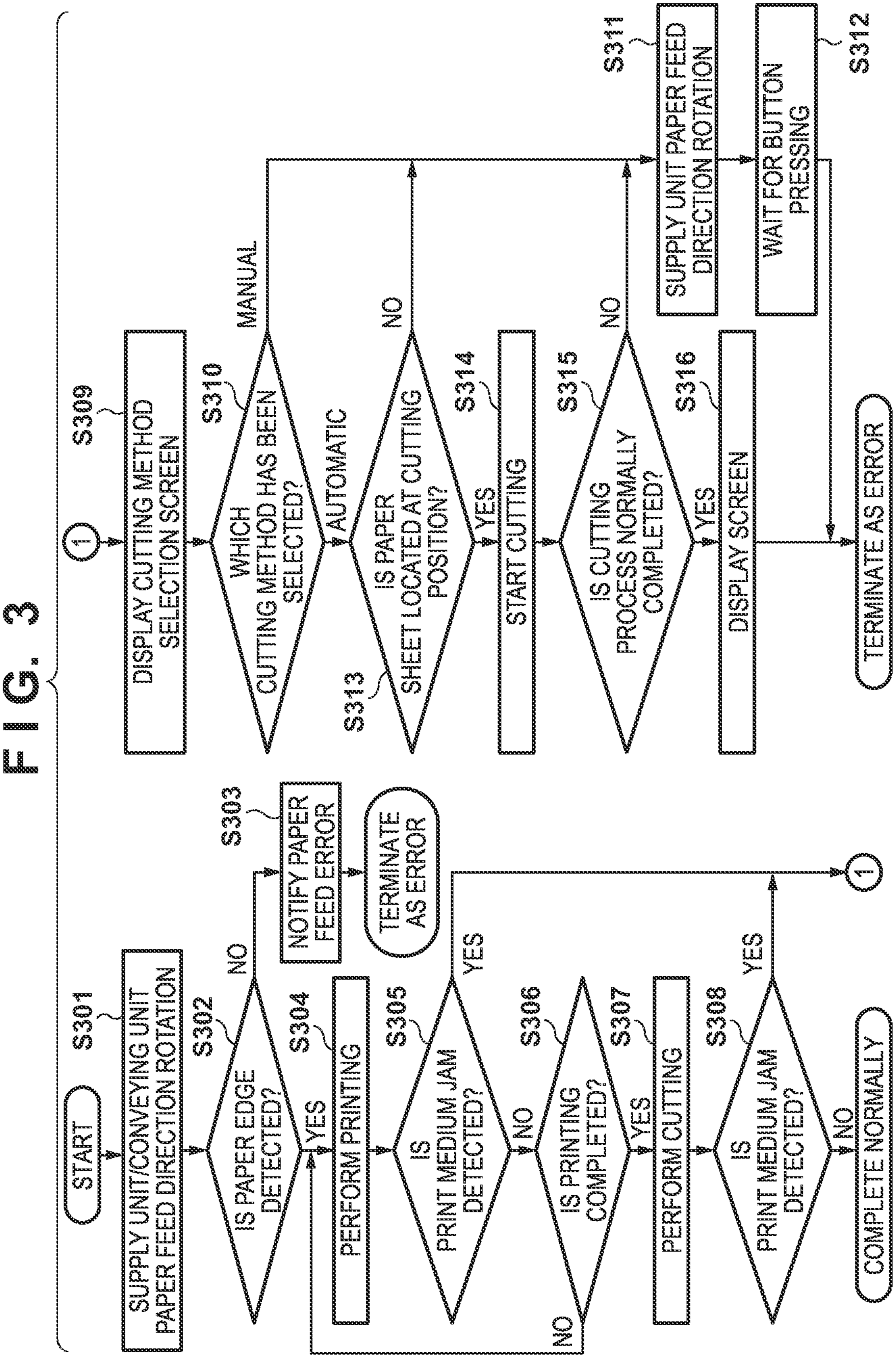
FIG. 3 is a flowchart illustrating an example of the process of the printing apparatus according to the embodiment.

Next, with reference to FIG. 3, the print process according to this embodiment will be described. The process illustrated in FIG. 3 is implemented by, when the printing apparatus 1 receives a print instruction from an external apparatus (not shown), executing the program stored in the ROM 202 or the like by the CPU 201 shown in FIG. 2.

First, in step S301, the CPU 201 controls the supply unit driving motor 206 and the conveying unit driving motor 207 to rotate the roll sheet in the forward direction so as to convey the sheet to the downstream side in the conveying direction. Then, in step S302, the CPU 201 determines, by the paper edge detecting sensor 210, whether the paper edge has reached the carriage 12. If it is determined that the paper edge has not reached the carriage 12 (No in step S302), the CPU 201 advances the process to step S303, notifies of a paper feed error on the operation panel 212 via the input/output OF 211, and terminates the print process illustrated in FIG. 3 as an error. In one example, if the paper edge is not detected even by the conveyance sensor 3 arranged downstream of the conveying unit 11, a notification requesting to check whether the roll sheet is set may be given in step S303, and control for returning the process to step S301 may be performed.

Subsequently, if it is determined that the paper edge has reached the carriage 12 (Yes in step S302), the CPU 201 advances the process to step S304, and performs printing by the printing unit 5. Then, in step S305, the CPU 201 determines whether a print medium jam is not detected. In step S305, it may be determined that a print medium jam is detected if it is detected that the printing unit 5 does not move normally. If a print medium jam is detected during performing the printing (Yes in step S305), the CPU 201 advances the process to step S309, which will be described later. If no print medium jam is detected during performing the printing (No in step S305), the CPU 201 advances the process to step S306. In step S306, it is determined whether the printing is completed. Completion of the printing includes that the print process has reached a step of executing a roll sheet cutting instruction included in the print instruction. If it is determined that the printing is not completed (No in step S306), the CPU 201 returns the process to step S304, and continues to perform the printing. If it is determined that the printing is completed (Yes in step S306), the CPU 201 advances the process to step S307, engages the cutter unit 15 with the carriage 12, and cuts the roll sheet by the cutter unit 15 pulled by the carriage 12.

Subsequently, the CPU 201 advances the process to step S308, and determines whether a print medium jam is detected. In one example, it may be determined in step S308 that a print medium jam is detected if it is detected that the carriage 12 does not move normally. If a print medium jam is detected during the cutting process (Yes in step S308), the CPU 201 advances the process to step S309. If no print medium jam is detected during performing cutting (No in step S308), the CPU 201 determines that the print process sequence is normally completed, and terminates the process illustrated in FIG. 3. If the print process is normally completed, the CPU 201 may execute a next print instruction or wait for a next print instruction.

Next, in step S309, the CPU 201 displays, on the operation panel 212 via the input/output I/F 211, a screen for selecting whether the printing apparatus automatically cuts the roll sheet or the user manually cuts the roll sheet to process the print medium jam. As one example, a display item (for example, a button) for accepting the manual cutting process and a display item (for example, a button) for accepting the automatic cutting process are displayed on the screen so as to be selectable. Then, in step S310, the CPU 201 determines which one of the cutting methods has been selected.

If manual cutting is selected in step S310 (manual in step S310), the CPU 201 advances the process to step S311, and performs a control process to be described later. On the other hand, if automatic cutting is selected (automatic in step S310), the CPU 201 advances the process to step S313.

In step S311, the supply unit driving motor 206 is operated so as to rotate the roll sheet in the paper feed direction. On the other hand, the conveying unit driving motor 207 stops conveyance before the supply unit driving motor 206 is operated. That is, the conveying unit driving motor 207 is not operated in a state in which the sheet is nipped by the conveying unit 11. Thus, the slack (loop) of the roll sheet caused by the paper feed is generated between the roll sheet 10 being fed and the conveying unit 11 nipping (stopping conveyance of) the sheet. Accordingly, the user can draw the loop outside the printing apparatus 1, cut the roll sheet, and pull out the cut roll sheet from the conveying unit side. Thus, the print medium jam can be easily eliminated. Further, since the user is allowed to work near the holding unit of the roll sheet 10, a larger work space can be secured as compared with the case of working inside the housing, so that convenience can be improved. Furthermore, it is possible to reduce the possibility of unintentionally touching the carriage 12 or the cutter unit 15 during the jam process performed by the user. It is also possible to reduce the possibility that, by the cutter or scissors operated by the user, the inside of the printing apparatus is damaged, or the carriage, the cutter unit 15, or the like is damaged or moved. In addition, even when the size of the opening 6 of the frame 2 is limited to secure the rigidity, the convenience of the jam process performed by the user can be improved.

Note that it has been described that the conveying unit driving motor 207 of this embodiment is not operated in the control process in step S311. In one example, if the pressure for nipping the roll sheet can be changed by, for example, changing the inter-axis distance between the driving roller and the driven roller, the conveying unit 11 may be operated so as to decrease the pressure for nipping the roll sheet in step S311. With this operation, the user can remove the roll sheet more easily, and the convenience can be further improved.

After forming the loop of the roll sheet in step S311, the CPU 201 advances the process to step S312, and displays, on the operation panel 212, a message requesting to cut the roll sheet and a message requesting to press a button after the jam process is completed.

Here, with reference to FIGS. 4A to 4C, a conventional jam process performed by a user and the jam process according to this embodiment will be described.

Figure 4A:
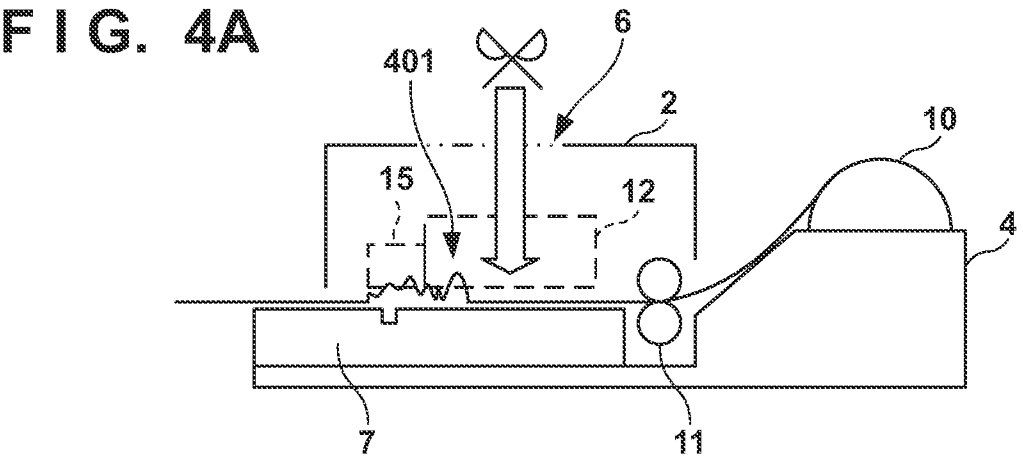
FIGS. 4A to 4C are sectional views of the printing apparatus in a case in which a user performs a jam process.

FIG. 4A is a view showing the conventional jam process performed by a user. In FIG. 4A, it is assumed that a print medium jam 401 has occurred near the cutter unit downstream of the carriage. In this case, the cutter unit cannot move due to the print medium jam 401 having occurred. Further, the conveying unit 11 cannot rewind the roll sheet due to the print medium jam having occurred. Therefore, the user is required to eliminate the print medium jam by cutting, using scissors or a cutter near the carriage, the roll sheet around the place where the print medium jam has occurred. In this case, the work space is limited by the housing, so the user may not cut the roll sheet as desired. Further, the user may unintentionally damage the carriage or the cutter unit by the scissors or the cutter.

Figure 4B:
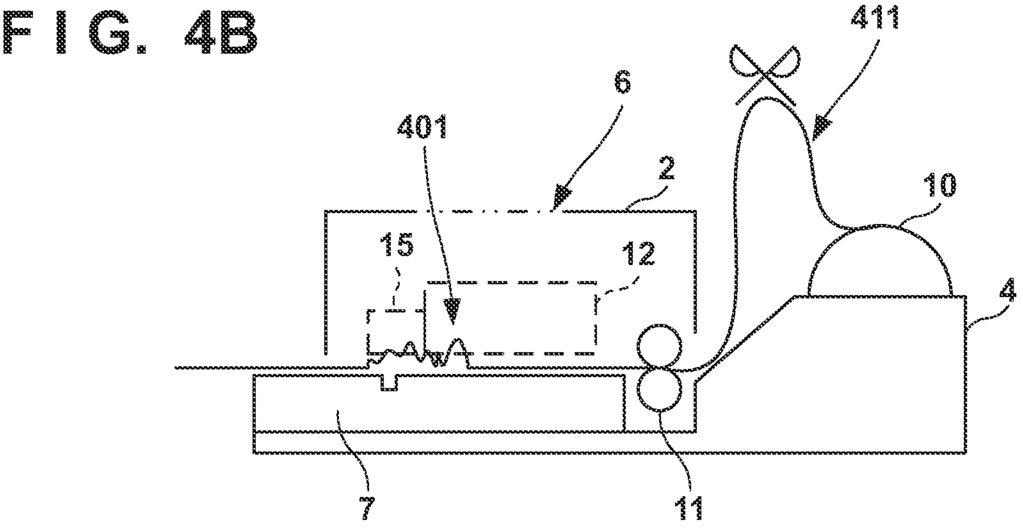
Figure 4C:
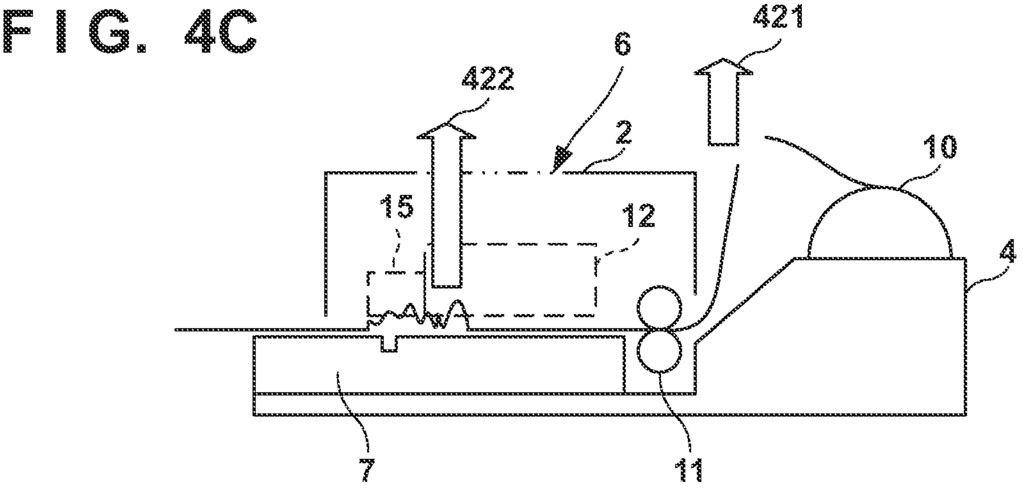

To the contrary, FIG. 4B is a view showing the jam process performed by a user according to this embodiment. As in FIG. 4A, it is assumed in FIG. 4B that the print medium jam 401 has occurred near the cutter unit downstream of the carriage. In this case, slack 411 of the roll sheet is generated upstream of the conveying unit 11 by the process in step S311, so that the user can draw the slack roll sheet and cut the roll sheet in a larger work space. Further, by drawing the cut roll sheet in the direction of an arrow 421 in FIG. 4C with a force larger than the nipping force of the conveying unit 11, the sheet in which the print medium jam has occurred can be removed. In addition, by drawing the roll sheet in the direction of an arrow 422 by inserting a hand from the printhead side only when removing the paper, it is possible to remove the roll sheet without damaging the carriage or the cutter unit by the scissors or the cutter.

If pressing of the button indicating completion of the jam process is accepted from the user in step S312, the CPU 201 terminates the process illustrated in FIG. 3 as an error. In one example, after the pressing of the button by the user is accepted in step S312, it may be determined whether the paper edge detecting sensor 210 detects the roll sheet remaining between the downstream of the conveying unit 11 and the carriage 12. If the paper edge detecting sensor 210 detects the roll sheet, the CPU 201 may determine that the jam process is not completed, and continue giving a notification to the user and waiting for pressing of the button indicating completion of the jam process.

In step S313, the CPU 201 determines, based on the detection result of the paper edge detecting sensor 210, whether the paper sheet is located at a position where cutting is possible. Whether the paper sheet is located at a position where cutting is possible may be determined based on whether the detecting unit 13 detects the paper. If the CPU 201 determines that the paper sheet is not located at a position where cutting is possible (No in step S313), the CPU 201 advances the process to step S311. On the other hand, if the CPU 201 determines that the paper sheet is located at a position where cutting is possible (Yes in step S313), the CPU 201 advances the process to step S314, and starts cutting by the cutter unit 15.

Subsequently, the CPU 201 advances the process to step S315, and determines whether the cutting process is normally completed. The process in step S315 may be determined based on whether the cutting process by the cutter unit 15 is normally completed without detecting any abnormality by a pressure sensor included in the detecting unit 13. If the CPU 201 determines that the cutting process is normally completed (Yes in step S315), the CPU 201 advances the process to step S316, notifies the user to remove the cut roll sheet, and waits until the user presses the button indicating that the roll sheet has been removed.

Note that in one example, the CPU 201 may control the supply unit driving motor 206 and the conveying unit driving motor 207 to rewind the roll sheet and perform the jam process in step S316. In this case, in step S316, the user may be notified that the printing is terminated as an error, and pressing of the button indicating that the user has confirmed the notification may be waited for. In another example, in step S316, the CPU 201 may request the user to remove the roll sheet from the conveying unit 11 side, and wait until the user presses the button indicating that the roll sheet has been removed. With this operation, no roll sheet remains downstream of the conveying unit 11, so that the CPU 201 can restart the process from step S301 after the jam process is completed.

As has been described above, according to the printing apparatus according to this embodiment, if the printing apparatus determines that predetermined conditions are satisfied, the printing apparatus operates so as to form a loop of the roll sheet by rotating the roll sheet in the conveying direction. With this operation, the user can easily perform the jam process by cutting the loop formed in the roll sheet, so that the convenience of the jam process can be improved.

Second Embodiment

In the first embodiment, the printing apparatus has been described in which the carriage pulls the cutter unit and the roll sheet is cut by the cutter. In the second embodiment, a printing apparatus will be described in which a cutter driving motor drives a cutter unit to cut a roll sheet. Note that components, processes, and functions similar to those in the first embodiment have the same reference numerals, and a description thereof will be omitted.

The printing apparatus according to the second embodiment includes the cutter driving motor. This enables a cutter unit 15 to move in the paper widthwise direction independently of a carriage 12. In this case, a print medium jam to be detected in step S308 of FIG. 3 may include that the cutter driving motor or the cutter unit 15 does not operate normally.

If a print medium jam is detected in step S308 since the cutter unit 15 does not move normally, it is highly likely that the print medium jam cannot be processed by automatic cutting of the roll sheet by the cutter unit 15. Therefore, if a print medium jam is detected in step S308 since the cutter unit 15 does not move normally, a screen for requesting manual cutting may be displayed in step S309, and the process may advance to step S311 while omitting the process in step S310. By determining whether or not to perform manual cutting depending on the unit having detected the print medium jam, it is possible to reduce the possibility that the user has to manually cut the roll sheet even though the user has selected automatic cutting. This improves user convenience.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-239283, filed Dec. 27, 2019, which is hereby incorporated by reference herein in its entirety.

What is claimed is:

1. A printing apparatus comprising:

a holding unit configured to rotatably hold a roll sheet;

a conveyance roller configured to convey the roll sheet in a first direction;

a printing unit configured to perform printing on the roll sheet conveyed by the conveyance roller;

a cover unit configured to cover at least a part of the printing unit and not to cover the holding unit; and a display unit configured to, in a case in which a jam of the roll sheet has occurred, display an instruction to cut a loop of the roll sheet formed between the holding unit and the printing unit and formed outside of the cover unit, wherein the loop is convex upward.

2. The printing apparatus according to claim 1, wherein the loop is formed upstream of the printing unit with respect to the first direction.

3. The printing apparatus according to claim 1, wherein the loop is formed between the holding unit and the conveyance roller.

4. The printing apparatus according to claim 1, wherein the loop is formed by supplying the roll sheet from the holding unit toward the printing unit.

5. The printing apparatus according to claim 1, further comprising:

a detecting unit configured to detect occurrence of the jam.

6. The printing apparatus according to claim 1, further comprising:

a cutting unit, arranged downstream of the printing unit in the first direction, configured to cut the roll sheet.

7. The printing apparatus according to claim 1, further comprising:

a carriage on which the printing unit is mounted, and configured to move in a scanning direction crossing the first direction.

8. The printing apparatus according to claim 7, wherein, in a case in which the carriage does not move normally, the display unit displays the instruction.

9. The printing apparatus according to claim 1, wherein the printing apparatus does not include a cover that covers the roll sheet held by the holding unit.

10. The printing apparatus according to claim 7, further comprising a cutting unit configured to cut the roll sheet, wherein the cutting unit has an engaging part engaging with the carriage.

11. The printing apparatus according to claim 10, wherein the cutting unit moves in the scanning direction by engaging the engaging part with the carriage.

12. The printing apparatus according to claim 1, wherein the display unit displays a display item for being pressed by a user in a case in which the jam has occurred.

13. The printing apparatus according to claim 1, wherein the printing unit performs printing in a state in which the roll sheet held by the holding unit is not covered.

14. The printing apparatus according to claim 1, wherein the display unit displays the instruction in response to an operation by a user after the jam has occurred.

15. The printing apparatus according to claim 14, wherein the operation includes pressing a display item displayed on the display unit.

16. The printing apparatus according to claim 1, wherein the printing unit performs printing by ejecting ink.

17. The printing apparatus according to claim 16, further comprising:

a carriage on which the printing unit is mounted and configured to move.

18. The printing apparatus according to claim 17, wherein the carriage mounts a tank configured to store ink supplied to the printing unit.

19. A control method of a printing apparatus comprising a holding unit configured to rotatably hold a roll sheet, a conveyance roller configured to convey the roll sheet in a first direction, a printing unit configured to perform printing on the roll sheet conveyed by the conveyance roller, and a cover unit configured to cover at least a part of the printing unit and not to cover the holding unit, the control method comprising:

displaying an instruction to cut a loop of the roll sheet formed between the holding unit and the printing unit and formed outside of the cover unit in a case in which a jam of the roll sheet has occurred, wherein the loop is convex upward.

20. The control method according to claim 19, further comprising:

detecting occurrence of the jam.

* * * * *